United States Patent [19]

Barthelman

[11] Patent Number: 5,622,587

[45] Date of Patent: Apr. 22, 1997

[54] METHOD FOR PRODUCING A THREE-DIMENSIONAL LAMINATED DECAL COMPOSITE

[76] Inventor: Kenneth L. Barthelman, 1521 Wheatridge, Wichita, Kans. 67235

[21] Appl. No.: 812,076

[22] Filed: Dec. 19, 1991

[51] Int. Cl.[6] ........................................ B32B 31/00
[52] U.S. Cl. ..................... 156/251; 156/219; 83/29; 83/53
[58] Field of Search ..................... 156/251, 219; 83/29, 53

[56] References Cited

U.S. PATENT DOCUMENTS

| | | | |
|---|---|---|---|
| 2,182,744 | 12/1939 | Ehrsam | 164/85 |
| 3,214,502 | 10/1965 | Schaar | 264/154 |
| 3,465,627 | 9/1969 | Vigneault | 83/171 |
| 3,490,362 | 1/1970 | Massari | 101/28 |
| 3,573,126 | 3/1971 | Kougel | 156/251 |
| 3,673,953 | 7/1972 | Massari | 101/19 |
| 3,701,707 | 10/1972 | Scholl et al. | 156/219 |
| 3,758,358 | 9/1973 | Kuroda | 156/251 |
| 3,826,167 | 7/1974 | Pelet et al. | 83/171 |
| 4,068,548 | 1/1978 | Ross | 83/1 |
| 4,121,960 | 10/1978 | Focht | 156/219 |
| 4,160,685 | 7/1979 | Kuroda | 156/251 |
| 4,209,354 | 6/1980 | Kuroda | 156/219 |
| 4,345,958 | 8/1982 | Kuroda | 156/221 |
| 4,384,908 | 5/1983 | Kleist | 156/88 |
| 4,581,088 | 4/1986 | House | 156/234 |
| 4,759,982 | 7/1988 | Jennsen et al. | 428/343 |
| 4,792,371 | 12/1988 | Miyota et al. | 156/131 |
| 4,867,826 | 9/1989 | Wayte | 156/219 |

*Primary Examiner*—Merrick Dixon
*Attorney, Agent, or Firm*—John W. Carpenter

[57] ABSTRACT

A method for producing a three dimensional laminated decal composite having a predetermined configuration with top edges being curved or arcuate. The method includes providing a decal support for supporting a decal, and securing a decal to the decal support to produce a laminated decal composite. A thermal die is produced with a die base and at least one cutting ridge secured to the die base. The cutting ridge in vertical cross-section is essentially shaped as an isosceles triangle with a preferred height of about 0.09 inches. The laminated decal composite is die-cut with the cutting ridge of the thermal die having a cutting temperature, a cutting pressure and a cutting dwell time to produce a three dimensional laminated decal composite having a predetermined configuration. A three dimensional laminated decal composite produced in accordance with the method.

25 Claims, 3 Drawing Sheets

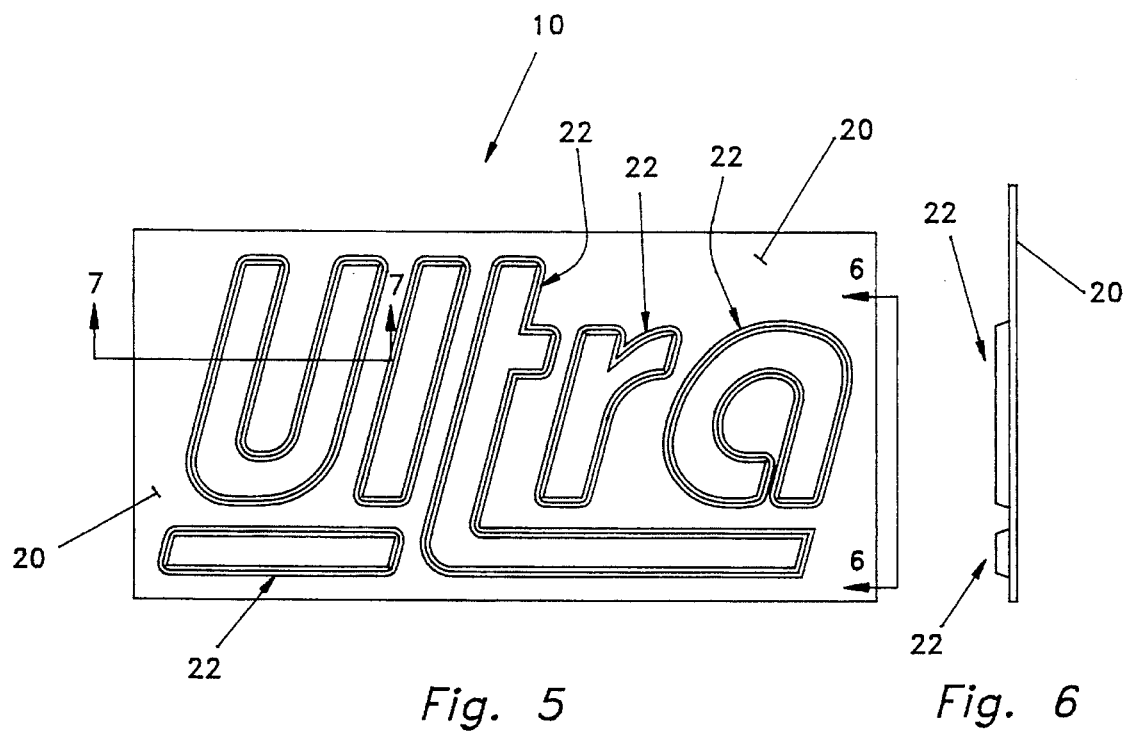
Fig. 5  Fig. 6
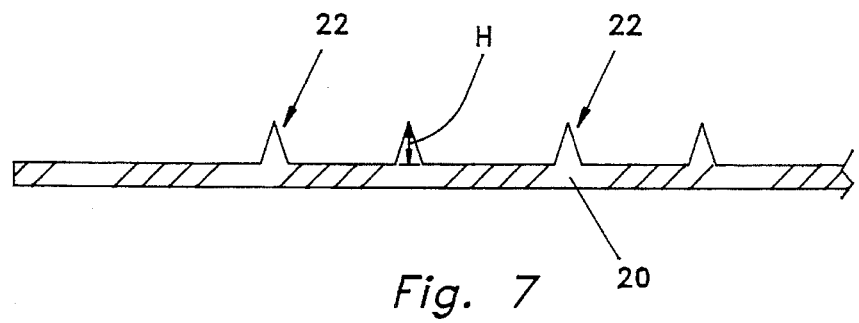
Fig. 7
PRIOR ART
Prior Art Decal
Prior Art Support
Fig. 16
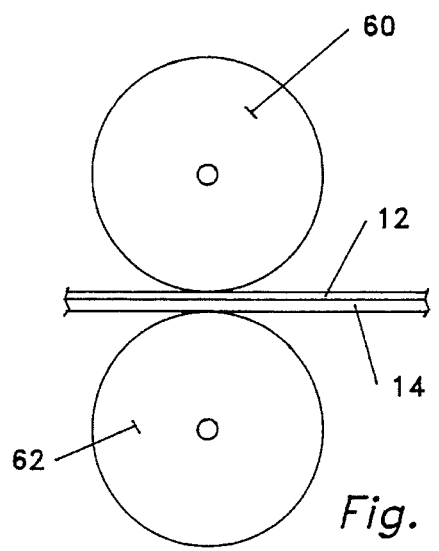
Fig. 17

METHOD FOR PRODUCING A THREE-DIMENSIONAL LAMINATED DECAL COMPOSITE

1. Field of the Invention

This invention is related to three-dimensional decals. More specifically, the present invention provides for a method for producing high thickness decal structure being a three-dimensional laminated decal composite with a predetermined and/or desired configuration.

2. Description of the Prior Art

A patentability investigation was conducted and the following prior art U.S. Patents were discovered:

| | | |
|---|---|---|
| 3,214,502 | Schaar | Oct. 26, 1965 |
| 4,160,685 | Kuroda | July 10, 1979 |
| 4,209,354 | Kuroda | June 24, 1980 |
| 4,345,958 | Kuroda | Aug. 24, 1982 |
| 4,384,908 | Kleist | May 24, 1983 |
| 4,581,088 | House | Apr. 8, 1986 |
| 4,759,982 | Jenssen et al. | July 26, 1988 |
| 4,792,371 | Miyota et al. | Dec. 20, 1988 |
| 2,182,744 | Ehrsam | Dec. 5, 1939 |
| 3,465,627 | Vigneault | Sept. 9, 1969 |
| 3,490,362 | Massari | Jan. 20, 1970 |
| 3,673,953 | Massari | July 4, 1972 |
| 3,826,167 | Pelet et al. | July 30, 1974 |
| 4,068,548 | Ross | Jan. 17, 1978 |

Schaar, U.S. Pat. No. 3,214,502 is not directed to decals, but rather, a method and apparatus for making adhesive tape. This patent teaches a showing of means to create perforations in a tape by passing a polyvinyl film, with an adhesive layer thereon and a thin facing sheet thereover, between a heated metal base roll and a knurled metal roll, whereby the projections on the knurled metal roll heat the polyvinyl film and causes it to form rounded edge "grommets".

Kuroda, U.S. Pat. No. 4,160,685 is directed to a method of making an applique article by providing a cover layer of plastic sheet material, an intermediate layer of resiliently compressible latently adhesive thermoplastic material and sandwiching the intermediate layer between the cover layer and a support material. A die is pressed against the cover layer, thereby bonding the cover layer to the support materials while severing the cover layer and intermediate layer along an outer contour line. This forms a cushion between the support material and the cover layer in the area surrounded by the outer bonding zone. Kuroda, U.S. Pat. No. 4,209,354 constitutes a minor variation of Kuroda U.S. Pat. No. 4,160,685, but without added significance to the invention at hand.

Kuroda, U.S. Pat. No. 4,345,958 is a still further variation of the Kuroda patents.

Kleist, U.S. Pat. No. 4,384,908 is directed to the cutting of webbing while shouldering and sealing the severed edges. The cutting is effected by a cutting blade in the presence of heat and pressure, and the die.

House, U.S. Pat. No. 4,581,088 discloses a method of forming decorative imitation jewels by causing a narrow margin of metal foil to adhere to the edges of a piece of plastic film, which is then cut by a heated die to a desired shape. The adhered foil gives the product an image of depth, and the edge of the plastic film is rounded by the heated die, enhancing an aesthetically pleasing effect. An adhesive backing is utilized so that the imitation jewel may be placed where desired, such as on a fingernail.

Jenssen et al., U.S. Pat. No. 4,759,982 is directed to a process for producing a transfer article having a protective clear coat in precise registration therewith. The article has rounded and sealed edges, and the edges of the underlying adhesive are sealed by the clear coat.

Miyota et al., U.S. Pat. No. 4,792,371 involves a method of forming trim cover for furniture or an automobile seat. In this arrangement, a sheet of covering material and wadding material is cut while being pressed and advanced to a backing sheet laminating station, where backing material sticks onto the wadding material side of the assembly. By this method, a finished product having at least one indent of a predetermined shape, such as an ornamental pattern, may be produced.

U.S. Pat. No. 2,182,744 Ehrsam teaches a punch and die particularly adopted for use in performing unset plaster board. U.S. Pat. No. 3,465,627 to Vigneault teaches a cutting die for cutting through an adhesive-backed thermoplastic film releasable adhered to a release paper. U.S. Pat. Nos. 3,490,362 and 3,673,953 to Massari teaches a die plate for embossing and cutting tape. U.S. Pat. No. 3,826,167 to Pelet et al. teaches a sign making apparatus. U.S. Pat. No. 4,068,548 to Ross teaches a method and tool of cutting desired pieces from a heat-severable material. None of the foregoing prior art teaches a method for producing a high thickness decal composite, more specifically a three dimensional decal.

Therefore, what is needed and what has been invented by me is a method for producing a high thickness decal composite utilizing a plastic cover (i.e. a vinyl cover) sheet which, by cutting with a deeply etched heated die, results in an attractive edge control (i.e. an arcuate or curvatous edge), and produces a desirable three-dimensional effect upon removal of background material.

SUMMARY OF THE INVENTION

The present invention accomplishes its desired objects by broadly providing a method for producing a three dimensional laminated decal composite having a predetermined configuration comprising the steps of:

a) providing a decal support means for supporting a decal;

b) securing a decal to the decal support means to produce a laminated decal composite;

c) providing a thermal die having a die base and at least one cutting ridge secured to the die base, said cutting ridge being essentially an isosceles triangle in vertical cross section;

d) die-cutting the laminated decal composite with the cutting ridge of the thermal die at a cutting temperature and a cutting pressure for a cutting dwell time to produce a three dimensional laminated decal composite having a predetermined configuration.

Preferably, the cutting temperature is from about 300 degrees to about 320 degrees F., and the cutting pressure is from about 500 psi to about 700 psi. The cutting dwell time is preferably not over about ½ second. The height of the isosceles triangle shaped cutting ridge is greater than about 0.06 inches, preferably about 0.09 inches. The decal support means has a lower melting point than the decal, and an acrylic based adhesive secures the decal to the decal support means. The three dimensional laminated decal composite(s) produced in accordance with the method have curved or arcuate top edges.

It is therefore an object of the present invention to provide a method for producing a three-dimensional laminated decal composite(s) having a predetermined configuration.

It is another object of the present invention to provide three dimensional laminated decal composite(s) produced in accordance with the method of the present invention.

These, together with the various ancillary objects and features which will become apparent to those skilled in the art as the following description proceeds, are attained by this novel method for producing a three dimensional laminated decal composite, a preferred embodiment as shown with reference to the accompanying drawings, by way of example only, wherein;

BRIEF DESCRIPTION OF THE DRAWINGS

FIG. 5 is a top plane view of the thermal die cutter;

FIG. 6 is a side elevational view taken in direction of the arrows and along the plane of line 6—6 in FIG. 5;

FIG. 7 is a vertical sectional view taken in direction of the arrows and along the plane of line 7—7 in FIG. 5;

FIG. 16 is a prior art decal (or film) secured or mounted on a support or substrate, and having a combined thickness of 0.002 inches to 0.010 inches with acute, non-arcuate top edges; and FIG. 17 is a side elevational view of the decal being laminated and secured to the decal support by passing both through a pair of closely spaced rollers.

DETAILED DESCRIPTION OF THE INVENTION

Figures 1, 2:
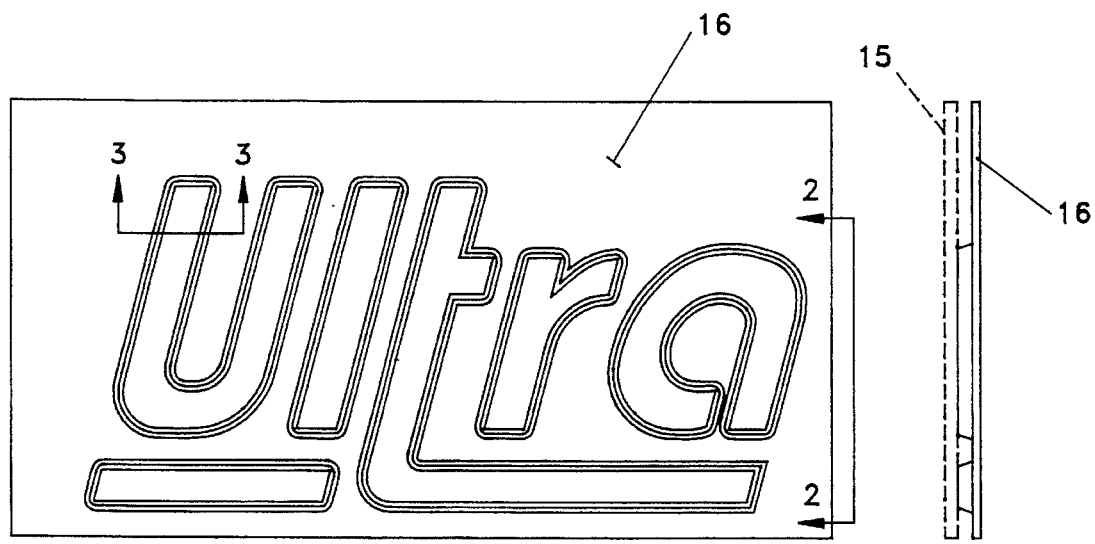
FIG. 1 is a top plan view of three-dimensional decals secured to a support or substrate.
FIG. 2 is a side elevational view taken in direction of the arrows and along the plane of line 2—2 in FIG. 1.
Figures 3, 4:
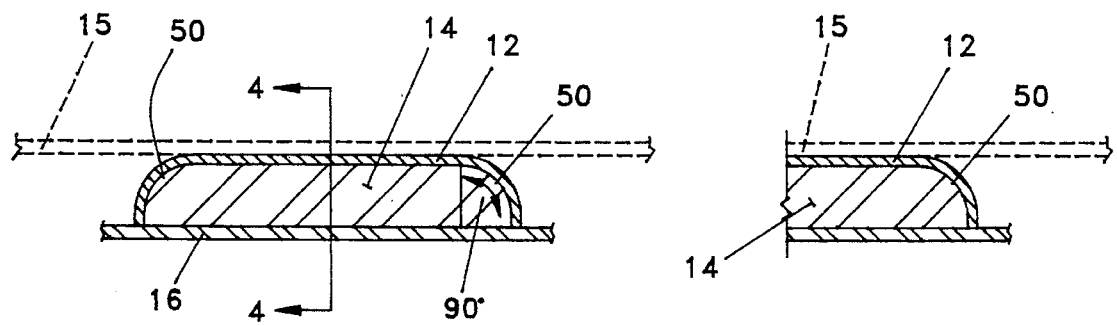
FIG. 3 is a vertical sectional view taken in direction of the arrows and along the plane of line 3—3 in FIG. 1.
FIG. 4 is a vertical sectional view taken in direction of the arrows and along the plane of line 4—4 in FIG. 3.
Figure 13:
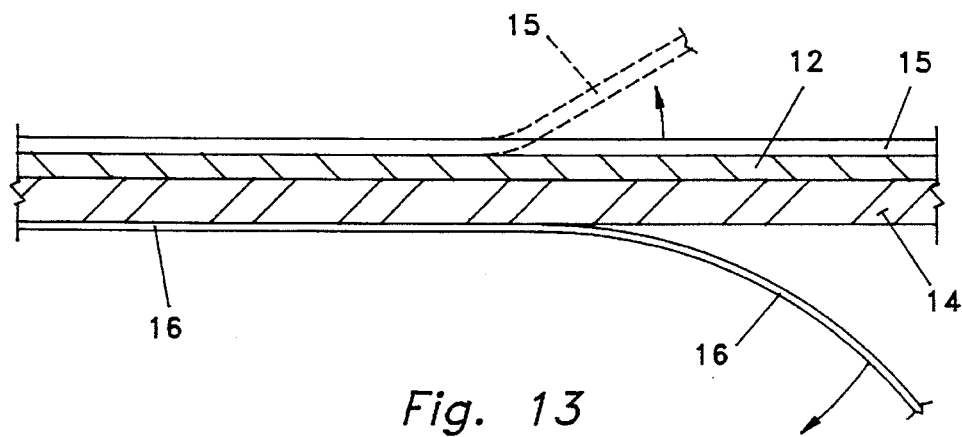
FIG. 13 is a partial sectional view illustrating the removing of the decal support backing or substrate from the thermal die cutted three dimensional decal of FIG. 1 for subsequent placement of the three dimensional decal on a more desired decal support surface.
Figure 8:
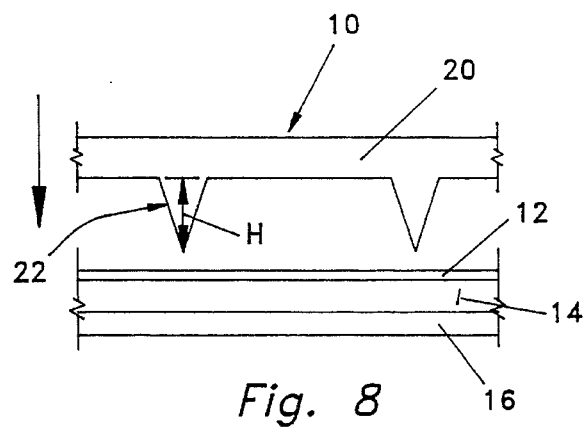
FIG. 8 is a partial side elevational view of a thermal die cutter approaching a decal laminated to a decal support which is supported by a decal support backing or substrate.
Figure 9:
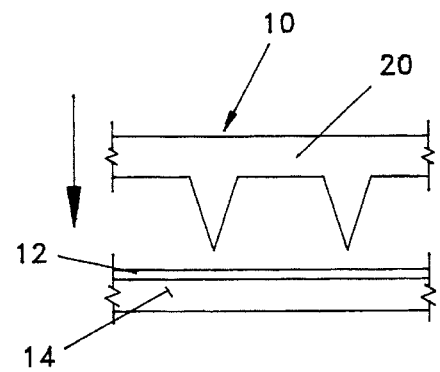
FIG. 9 is a partial side elevational view of a thermal die cutter approaching a decal laminated to a decal support for subsequently securing to a decal support backing or substrate for thereafter subsequent removal for placing on a more desired decal support surface, or for directly securing to the more desired decal support surface.
Figure 10:
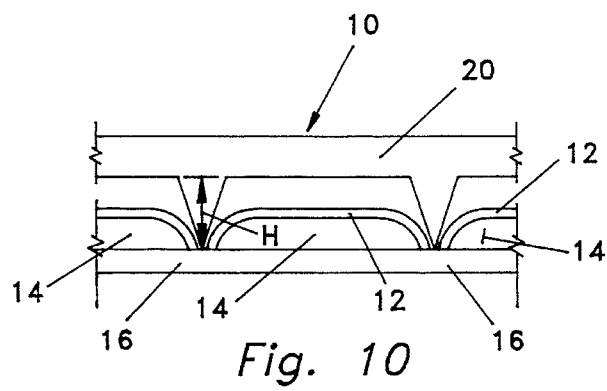
FIG. 10 is a partial side elevational view of the thermal die cutter of FIG. 8 cutting the laminated decal and decal support while not cutting the decal support backing or substrate.
Figure 11:
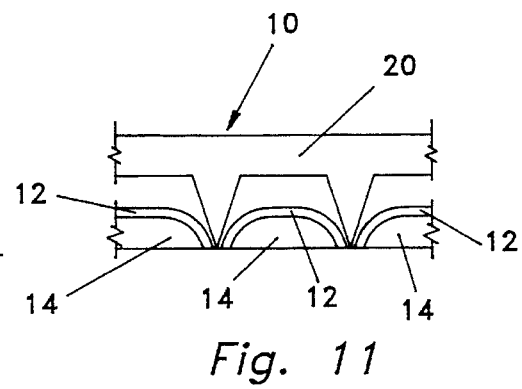
FIG. 11 is a partial side elevational view of the thermal die cutter of FIG. 9 cutting the laminated decal and the decal support supporting the decal.

Referring in detail now to the drawings wherein similar parts of the invention are represented by like reference numerals, there is seen a thermal die cutter, generally illustrated as 10, (see FIGS. 5, 6 and 7), for cutting thermally the combination of a decal 12 laminated (or otherwise secured to with a decal adhesive means) and supported by a decal support 14, which decal support 14 is supported by a support backing or substrate 16 (see FIGS. 8 and 10). Typically, a premask 15 is releasably secured to the decal 12 (see FIGS. 2–4 and 13) as an application tape that holds the various combined decal 12/decal support 14 at a desired spacing and order after or when the substrate 16 is removed and before securing the various combined decal 12/decal support 14 to a more desired location or surface. After the various combined decal 12/support 14 have been secured to a more desired location or surface, such as by pressing the exposed adhesive back (i.e. the surface where substrate 16 had been secured) thereagainst, the premask 15 is subsequently removed (see FIG. 13). The thermal die cutter 10 is optionally for cutting thermally the combination of the decal 12 laminated to and supported by the decal support 14 without the support backing or substrate 16 (see FIGS. 9 and 11).

Figure 14:
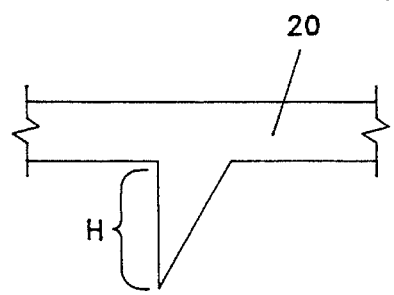
FIG. 14 is an optional cutting ridge for the thermal die cutter for producing three dimensional decals with arcuate or curved top edges.
Figure 15:
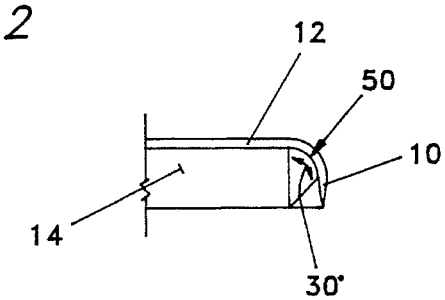
FIG. 15 is a partial vertical sectional view of an edge of a three dimensional decal having and defined by about a 30 degrees arc.

The thermal die cutter 10 may be any thermal die cutter 10 that is capable of heating, cutting, or otherwise producing the decal support 14 with at least one upper edge, generally illustrated as 50 and being arcuate and/or curved. Preferably all of the upper edges of the decal support 14 are arcuate upper edges 50 which are curved or arcuate such as to define an arc of from about 30 degrees (as depicted and illustrated in FIG. 15) to about 90 degrees (as depicted and shown in FIG. 3). As will be further discussed below, the decal 12 has a higher melting temperature than the decal support 14 and takes or conforms to the heated (i.e. melted) form of the decal support 14 during and after thermal cutting. The thermal die cutter 10 comprises a die base 20 having one or more cutting ridges, generally illustrated as 22, secured and/or integrally bound to the die base 20. The cutting ridge(s) 22 may be any cutting ridge(s) 22 capable of heating, cutting, or otherwise producing the decal support 14 with one or more arcuate upper edges 50 which are curved or arcuate such as to define an arc of from about 30 degrees (see FIG. 15) to about 90 degrees (see FIG. 3). The cutting ridge(s) 22 heat, cut, or otherwise produce the desired decal support 14 while and simultaneous to the decal 12 being adhered to or on the decal support 14. Preferably, the cutting ridge(s) 22 are triangular in vertical cross-section (see FIG. 14), more preferably isosceles triangular shape in vertical cross-section (see FIG. 7). The triangular shaped (in vertical cross-section) cutting ridge 22 has a height H that is greater than the combined height of the decal 12 and the decal support 14 such that the thermal base 20 does not come in contact with the decal 12 during the thermal heating and cutting procedure. Preferably height H ranges from about 0.04 inches to about 0.20 inches, preferably from about 0.07 inches to about 0.11 inches, more preferably about 0.09 inches. This is an important feature of the invention as will be further explained below. The thermal die cutter 10 is preferably a die comprising magnesium and/or a magnesium alloy, such as by way of example only the magnesium photographically etched thermal kiss cut die supplied by Owosso Graphic Arts. The thermal die cutter 10 is secured or mounted to a press plate of a press (not shown in the drawings), such as the Therm-X 1428 Press sold by Universal Products Mfg. or a similar press manufactured and supplied by Contech Inc. of Goddard, Kan. The thermal die cutter 10 is heated by a press (not shown) which electrically heats its and the associated press plate (not shown) to a desired temperature, which heated press plate thermally conducts its heat to the thermal die cutter 10.

One of the salient points of the present invention is that under the present process condition (i.e. die cutting temperatures, die-cutting pressures, die-cutting dwell time, etc.), the material or composition of the decal (film) 12 and decal support 14 have to be compatible with each other and the decal adhesive means has to include a composition that is compatible with the composition of the decal 12 and the decal support 14 to prevent such undesirable results as "bubbling up" of the decal 12 on the decal support 14 after thermal die cutting, especially over a period of time. The composition of the decal support 14 is critical to the production of the desired curvations or arcuate edges 50. The decal support 14 preferably comprises polyvinyl chloride with a pressure sensitive adhesive on an underside for releasably holding the substrate 16 and for adhering the decal support 14 to a more desired surface after removing the substrate 16. More preferably, the decal support 14 comprises a closed-cell polyvinyl chloride foam having a density ranging from about 20 lbs/cubic feet to about 30 lbs/cubic feet, a thickness ranging from about 0.03 inches to about 0.130 inches, and with an acrylic pressure sensitive adhesive on the underside or bottom to releasably hold the substrate 16. Most preferably, the decal support 14 comprises a black closed-cell polyvinyl chloride foam having a density of about 25 lbs/ft 3, a thickness of about 0.063 inches, and the acrylic pressure sensitive adhesive on the underside.

The decal (or film) 12 comprises a major proportion of a vinyl compound, preferably a compound having the vinyl grouping ($CH_2=CH-$) specifically vinyl chloride, vinyl acetate and similar esters, but also more generally those compounds such as styrene $C_6H_5CH:CH_2$, methyl methacrylate $CH_2: C(CH_3) COOCH_3$ and acrylonitrile $CH_2:CHCN$. The decal 12 also preferably has a sensitive adhesive on the bottom for steadfastly securing the decal 12 to the top of the decal support 14 when laminated together by a laminator (e.g. the Therm X 5200 laminator sold by Universal Products) that includes a pair of closely spaced rollers 60 and 62 which are biased towards each other such that when the decal 12 (with adhesive on the bottom) is passed against the top of the decal support 14 and between the rollers 60 and 62 (see FIG. 17), the decal 12 is laminated and secured steadfastly to the decal support 14 to produce a laminated decal composite. The vinyl decal 12 preferably has a thickness ranging from about 0.002 inches to about 0.02 inches. The adhesive underneath the decal 12 preferably has a thickness ranging from about 0.0006 inches to about 0.002 inches, and is an acrylic based (e.g. cyanoacrylates) pressure sensitive adhesive. One of the salient points of the invention is the acrylic based pressure sensitive adhesive because under the die-cutting process conditions of the present invention, the acrylic based pressure sensitive adhesive assist in preventing undesirable results such as the "bubbling up" of the decal 12 on the decal support 14 after thermal die cutting the laminated decal composite.

The vinyl decal 12 of the present invention may be any of the following commercially available vinyl decals 12: TFX vinyl from Universal Products; Acrylic Flock "Plushcal" from Flexcon Inc.; Flexible vinyl woodgrain "Woodcal" from Flexcon Inc.; and Neon Florescent vinyl form Ritrama Duramark. The TFX vinyl from Universal Products and other suitable vinyl decals 12 are listed in the following Table I along with their associated properties:

TABLE I

| | UNIVERSAL PRODUCTS PERFORMANCE SPECIFICATIONS 2 MIL PREMIUM CAST HIGH PERFORMANCE FILMS | | | | |
|---|---|---|---|---|---|
| PHYSICAL PROP. | P-SERIES AUTOMOTIVE GRADE ADHESIVE | P-SERIES COMMERICAL GRADE ADHESIVE | P-SERIES OELIFIN ADHESIVE | PM-SERIES OPAQUE MET. ADHESIVE | PT-SERIES TRANSLUCENT |
| THICKNESS: | | | | | |
| Film | .0021" | .0021" | .0021" | .0030" | .0025" |
| Adh. | .0012" | .0012" | .0012" | .0012" | .0012" |
| Total | .0033" | .0033" | .0033" | .0042" | .0037" |
| TENSILE: | 2000 lbs./sq. in | 2000 lbs./sq. in | 2000 lbs./sq. in | 1000 lbs./sq. in | 2000 lbs./sq. in |
| ELONGATION: | 125–150% | 125–150% | 125–150% | 75% | 200% |
| ADHESION: | | | | | |
| Avg. Value @ 24 hr @ 73° F. and 50% RH.    stainless steel | 64 oz./in. | 67 oz./in. | 72 oz./in. | 64 oz./in. | 64 oz./in. |
|     aluminum | 80 oz./in. | 80 oz./in. | 80 oz./in. | 80 oz./in. | 80 oz./in. |
|     polyethylene | 22 oz./in. | 24 oz./in. | 52 oz./in. | 24 oz./in. | 22 oz./in. |
| DIMENSIONAL STABILITY: | | | | | |
| 48 hours @ 150° F. | <1/64" | <1/64" | <1/64" | <1/64" | <1/64" |
| CHEMICAL RESISTANCE: | | | | | |
| Anti-freeze   24 hr. exp. | EXCELLENT | EXCELLENT | EXCELLENT | EXCELLENT | EXCELLENT |
| Unlead. gas   1 hr. exp. | EXCELLENT | EXCELLENT | LIMITED | EXCELLENT | EXCELLENT |
| 10% HCL   10 min. exp. | EXCELLENT | EXCELLENT | EXCELLENT | EXCELLENT | EXCELLENT |
| 10% NAOH   10 min. exp. | EXCELLENT | EXCELLENT | EXCELLENT | EXCELLENT | EXCELLENT |
| Dist. Water   24 hr. exp. | EXCELLENT | EXCELLENT | EXCELLENT | EXCELLENT | EXCELLENT |
| SAE 20 oil   24 hr. exp. | EXCELLENT | EXCELLENT | EXCELLENT | EXCELLENT | EXCELLENT |
| Detergent   24 hr. exp. | EXCELLENT | EXCELLENT | EXCELLENT | EXCELLENT | EXCELLENT |
| ABRASION RESISTANCE: | Tabor Abraser, CS 17 Wheels, 500 G. Passes 500 cycles | | | | |
| SALT SPRAY RESIST.: | No effect after 240 hrs. | | | | |
| COLOR MATCH TOLERANCE: | Not to exceed .5 Delta E units for non-metallic, opaque films. | | | | |
| SERVICE LIFE: | From –40° F. to +220° F. | | | | |
| APPLICATION TEMP.: | Minimum of 55 F | | | | |
| WEATHERABILITY: | | | | | |

TABLE I-continued

UNIVERSAL PRODUCTS PERFORMANCE SPECIFICATIONS
2 MIL PREMIUM CAST HIGH PERFORMANCE FILMS

| PHYSICAL PROP. | P-SERIES AUTOMOTIVE GRADE ADHESIVE | P-SERIES COMMERICAL GRADE ADHESIVE | P-SERIES OELIFIN ADHESIVE | PM-SERIES OPAQUE MET. ADHESIVE | PT-SERIES TRANSLUCENT |
|---|---|---|---|---|---|
| Under normal exposure conditions, based on accelerated weathering & actual exposures in FL., AZ., & KS. | 5–7 yrs | 5–7 yrs | 5–7 yrs | 5 yrs. | 5–7 yrs. |
| SHELF LIFE: | 2 yr. min. @ 73° F. & 50% R.H. when stored away from direct sunlight. | | | | |
| PREPARATION OF APPLICATION SURFACES: | For general cleaning requirements TFX Cleaner/wax Remover or it's equivalent is recommended. Removal of oily substances should be cleaned with ISOPROPANOL. | | | | |

The properties of the Acrylic Flock "Plushcal" and Flexible vinyl woodgrain "Woodcal", both from Flexcon Inc., are respectively listed as follows:

PLUSHcal
Flock/Vinyl Film

General Description:

PLUSHcal flock/vinyl film is a random acrylic flock on a color coordinated 3.5 mil vinyl film coated with V-23, a permanent acrylic, pressure-sensitive adhesive. PLUSHcal is backed by either a 90 PRT PFW liner for sheet form use or 78 M&O for roll form.

Application:

This conformable, velvet-textured flock/vinyl film, is ideal for use as plush labels or decals for cosmetic, jewelry, or liquor packaging, adorable "kid" stickers, high-quality emblems, greeting card appliques . . . a varity of creative end uses.

PLUSHcal Variations:

This random acrylic flock/vinyl film is an ideal product for the vertical blind industry . . . referred to as FLEXsuede.

PLUSHcal Colors:

Custom color matching is available: however, the stock colors include:

| Beige | Burgundy | Light Grey |
| Camel | Red | Dark Grey |
| Dark Brown | Dark Green | Royal Blue |
| Copper | Black | Navy Blue |
| White | | |

| PRODUCT DATA | VALUE | TEST METHOD |
|---|---|---|
| PHYSICAL PROPERTIES | | |
| Gauge | 20 mils (500 microns) ± 15% | ASTM 1593 |
| Dimensional Stability | good: <1% shrinkage | 6" × 6" sample: oven exposure 160° F. for 24 hrs |
| Elongation | | ASTM D-882 |
| MD | 128% | |
| TD | 200% | |
| Tensile Strength | | ASTM D-882 |
| MD | 14.6 psi | |
| TD | 12.3 psi | |
| CHEMICAL PROPERTIES | | |
| Solvent Stability | Film contact not recommended | ASTM D-471 |
| Water Stability | Film contact not recommended: PLUScal surface will become matted upon contact | ASTM D-471 |
| Humidity Stability | Excellent: no change in film or adhesion | ASTM D-471 |
| ADHESION PROPERTIES | | |
| Peel Values (oz/in) Stainless Steel | | PSTC #1 |
| 1 hour | 33.6 oz/in | |
| 7 days | 64.0 oz/in | |
| Service Temperature | 0° F. (−17° F. (77° C.) | |
| Minimum Application Temperature | 35° F. (2° C.) | |
| Storage Stability | Shelf life of 2 years when stored under conditions of 21° C. (70° F.) and 50% relative humidity. | |
| Expected Exterior Life | Not recommended for outdoor use | |

FLEXmark WV-600 FILMS

| GENERAL DESCRIPTION | A flexible, 6 mil (150 microns), or alternatively about 0.016 inches, permanent, acrylic, pressure-sensitive adhesive. |
|---|---|
| APPLICATIONS | This product is intended for use as high-quality markings with applications requiring a realistic woodgrain finish,; e.g., stereo components, jewelry boxes, electrical appliances, desk accessories, picture frames and decorative trim. |
| PRODUCT VARIATIONS | Available with several adhesives, release liners and in a "stabilized" construction which minimizes shrinkage of the film. |
| EXPECTED EXTERIOR LIFETIME | Recommended for limited exterior exposure. |
| PHYSICAL PROPERTIES | THICKNESS: 7 mils (175 microns) ± 10% including DIMENSIONAL STABILITY: Fair; up to 2% shrinkage may occur on an applied surface. |
| CHEMICAL PROPERTIES | WATER STABILITY: Fair. HUMIDITY STABILITY: Excellent. SOLVENT STABILITY: Fair. Direct contact of a strong solvent to the film's surface may distort the woodgrain finish. |
| SERVICE TEMPERATURE RANGE | −4° F. (−20° C.) to 176° F. (80° C.), MINIMUM APPLICATION TEMPERATURE: 50° F. (10°). |
| ADHESION | PSTC Test Method #1, modified for a 15 min. dwell time with 1 mil (25 microns) of V-10 adhesive. WV-600-F     Oz/In     Newtons/ |

9
-continued

| | 40 Meter 440 |
|---|---|
| GENERAL DESCRIPTION | A flexible, 6 mil (150 microns), or alternatively about 0.006 inches, flexible, subsurface printed, woodgrain patterned vinyl films coated with our V-106 permanent, acrylic pressure-sensitive adhesive. |
| APPLICATIONS | These realistically detailed WOODcal vinyl films are well-suited for decorative appliques, furniture, and vending machines. |
| PRODUCT VARIATIONS | These films are available with a variety of adhesives and release liners. For specific applications, consult our Technical Service Department. |
| EXPECTED EXTERIOR LIFETIME | A minimum of two (2) years for exterior applications. |
| PHYSICAL PROPERTIES | THICKNESS: 7 mils (175 microns) ± 10% including adhesive. DIMENSIONAL STABILITY: Good. |
| CHEMICAL PROPERTIES | WATER STABILITY: Excellent. HUMIDITY STABILITY: Excellent. LIGHT STABILITY: Excellent. SOLVENT STABILITY: Good for most petroleum solvents and lower aliphatic alcohols. Poor towards most esters and ketones. |

The product description and typical performance values for the Neons from Ritrama Duramark are listed in the following Table II:

TABLE II

PRODUCT DESCRIPTION

| | |
|---|---|
| Film Caliper | .0045 inches or about 0.002 inches |
| Adhesive | Permanent Acrylic |
| Release Liner | 78# Kraft |
| Printability | |
| Inks | Conventional and UV-Curable |
| Methods | Flat and Rotary Screenprinting |
| Pretesting of all inks and printing methods is recommended | |
| Processability | Steel Rule, Thermal and Rotary Die-cutting Computerized Sign-making |
| Outdoor Durability | 2 Years |
| Minimum Substrate Application Temp. | 40° F. |
| Service Temp. Range | −50° F. to +225° F. |

TYPICAL PERFORMANCE VALUES

| | |
|---|---|
| Adhesion Values Stainless Steel Substrate 180° Peel @ 10 in./ Min. 73° | |
| 20 Min. | 50 Oz./In. |
| 24 Hrs. | 72 Oz./In. |
| Shelf Life (@ 73° F., 50% R.H.) | 1 Year |
| Film Flammability | Self-Extinguishing |
| Dimensional Stability (48 Hrs. @ 150° F.) | .02 In. |
| Chemical Resistance | |
| Anti-freeze (24 Hrs.) | No Effect |
| Detergent (24 Hrs.) | No Effect |
| Distilled Water (24 Hrs.) | No Effect |
| SAE 20 Motor Oil (24 Hrs.) | No Effect |
| Gasoline (1 Hr.) | No Effect |
| 10% HCl (10 Min.) | No Effect |
| 10% NH$_4$OH (10 min.) | No Effect |

10

The process die cutting conditions of the present invention may be any suitable conditions which would produce the three dimensional decal of the present invention. Preferably, the laminated decal composite is die cut at a temperature (i.e. the die cutter 10 having a temperature) ranging from about 260° F. to about 360° F., more preferably from about 280° F. to about 340° F., most preferably from about 300° F. to about 320° F. The thermal cutting pressure with the Therm-X press lowering the die cutter 10 into the laminated decal composite (see FIGS. 10 and 11) is less than about 650 psi, preferably from about 450 psi to less than about 650 psi; more preferably from about 500 psi to about 600 psi. The thermal cutting dwell (i.e. the time the cutting ridge(s) 22 is in contact with the laminated decal composite in the cutting operation) is preferably from about 0.1 sec. to about 0.8 sec.; more preferably from about 0.2 sec. to about 0.6 sec.; most preferably from about 0.25 sec. to about 0.5 sec. Most preferably further, the die cutting dwell time is not to be over about 0.5 secs. with the thermal cutting pressure minimal (i.e. 600 psi using a Therm-X press) because it has been discovered that excessive pressure and/or dwell time will cause a less than a durable edge 50 on the produced three dimensional decal.

Continuing to reference the drawings for operation of the invention, the decal support 14 is provided such as to preferably comprise for the best mode of the invention, a closed-cell polyvinyl chloride foam having a density of about 25 lbs per cubic feet and a thickness selected from the following thicknesses: 0.032 inches, 0.063 inches, and 0.125 inches. Typically, the provided decal support 14 will have an acrylic base adhesive on the bottom with the substrate 16 releasably secured thereto. The decal 12 is provided with the acrylic adhesive (i.e. Cyanoacrylate) on the bottom thereof for securing the bottom of the decal 12 to the top of the decal support 14. The decal 12 is preferably a vinyl film selected from the following group: TFX vinyl having a thickness of about 0.002 inches and manufactured by Universal Products; Acrylic Flock "Plushcal" manufactured by Flexcon Inc. and having a thickness of about 0.16 inches; Flexible vinyl woodgrain "Woodcal" having a thickness of about 0.006 inches and manufactured by Flexcon Inc.; and Neon Florescent vinyl having a thickness of about 0.002 inches and manufactured by Ritrama Duramark.

After the decal 12 is provided, the bottom of the decal 12 with the acrylic adhesive is laminated and secured to the top of the decal support 14 by contacting the acrylic based bottom of the decal 12 to the top of the decal support 14 and passing the combination through a laminator, more specifically through the space between the pair of rollers 60 and 62 to steadfastly secure the decal 12 to the decal support 14 and produce a laminated decal composite (see FIGS. 8 and 9) which preferably has a thickness of from about 0.032 inches to about 0.065 inches and is to be thermal die cutted with the thermal die cutter 10.

The thermal die cutter 10 (i.e. a magnesium die) is provided by etching to a special preferable depth of about 0.09 inches (rather than the prior art depth of 0.05 to 0.06 inches) to produce cutting triangular ridges 22 having a height of preferable about 0.09 inches (rather than the prior art depth of 0.05 to 0.06 inches). This added depth allows the cutting of the thicker material with minimal sticking. The die 10 is coated with CTF teflon coating to reduce sticking. The die 10 also must be wiped with Potdevin M-12 release coat as needed.

Figure 12:
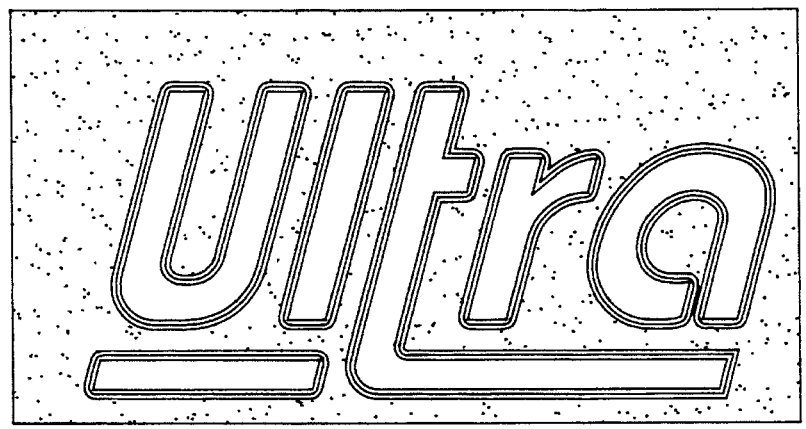
FIG. 12 is a top plan view of a thermal die cutter decal laminated and supported by a decal support which is backed and supported by a support backing or substrate, with the spotted, speckled or dotted section representing the section to be weeded or otherwise removed to produce the three dimensional decal of FIG. 1.

The laminated decal composite material is die cut (see FIGS. 10 and 11) down to the substrate 16 at temperatures of from 300 to 320 degree F. depending on the properties of the vinyl decal 12. Pressure should be minimal (600 lbs. using a Therm-x press) and dwell time should not be over ½ second. Excessive pressure or dwell time will cause a less durable edge on the product. After the decal composite is cut (see FIG. 12), the excess vinyl (represented as the speckled or dotted portion in FIG. 12) is weeded away leaving the finished image (see FIG. 1). Premask 15 is then applied to the finished product so the three dimensional decal can be removed from the liner 16 and applied by the customer. The decal 12 on the finished three dimensional decal essential extends all the way down arcuate edges 50 of the decal support 14 (see FIGS. 3 and 4) to essentially completely cover the edges 50 (see FIG. 15)

While the present invention has been described herein with reference to particular to particular embodiment thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A method for producing a three dimensional laminated decal composite having a predetermined configuration including a decal member being adhered to a decal support member with an acrylic based sensitive adhesive that prevents "bubbling up" of the decal member on the decal support member after the production of the three dimensional laminated decal composite, comprising the steps of:

(a) providing a decal support including a top and comprising a closed-cell polyvinyl chloride foam having a density ranging from about 20 lbs/cubic feet to about 30 lbs/cubic feet and having a decal support melting temperature;

(b) providing a decal with a decal melt temperature that is greater than the decal support melting temperature and comprising a major proportion of a vinyl compound, and having an acrylic based pressure sensitive adhesive on a bottom thereof;

(c) securing the top of the decal support to the bottom of the decal having the acrylic based pressure sensitive adhesive by contacting the bottom of the decal having the acrylic based pressure sensitive adhesive with the top of the decal support to produce a decal/decal support combination and subsequently passing the decal/decal support combination through a laminator to produce a laminated decal composite;

(d) providing a thermal die having a die base and at least one cutting ridge secured to the die base and having a height greater than about 0.07 inches;

(e) die-cutting the laminated decal composite of step (c) with the cutting ridge of step (d) and at a cutting temperature ranging from about 260° F. to about 360° F. and a cutting pressure less than about 650 psi and a cutting dwell time ranging from about 0.1 sec. to about 0.8 sec. to produce a three dimensional laminated decal composite having a predetermined configuration and with the acrylic based sensitive adhesive of step (b) preventing "bubbling up" of the decal of step (b) on the decal support of step (a).

2. The method of claim 1 additionally comprising providing the decal support to comprise a thickness ranging from about 0.03 inches to about 0.13 inches.

3. The method of claim 2 additional comprising providing the decal support with a second acrylic base pressure sensitive adhesive on a bottom thereof; providing a substrate; and engaging the substrate to the second acrylic base pressure sensitive adhesive for releasably holding the substrate to the decal support.

4. The method of claim 1 wherein said acrylic based pressure sensitive adhesive in step (b) has a thickness ranging from about 0.0006 inches to about 0.002 inches.

5. The method of claim 3 wherein said acrylic based pressure sensitive adhesive in step (b) has a thickness ranging from about 0.0006 inches to about 0.002 inches.

6. The method of claim 1 wherein said produced laminated composite of step (c) comprises a thickness ranging from about 0.032 inches to about 0.065 inches.

7. The method of claim 5 wherein said produced laminated composite of step (c) comprises a thickness ranging from about 0.032 inches to about 0.065 inches.

8. The method of claim 1 wherein said cutting ridge has a height ranging from about 0.07 inches to about 0.11 inches.

9. The method of claim 7 Wherein said cutting ridge has a height ranging from about 0.07 inches to about 0.11 inches.

10. The method of claim 1 wherein said cutting temperature ranges from about 300° F. to about 320° F.

11. The method of claim 9 wherein said cutting temperature ranges from about 300° F. to about 320° F.

12. The method of claim 1 wherein said cutting pressure ranges from about 500 psi to about 600 psi.

13. The method of claim 11 wherein said cutting pressure ranges from about 500 psi to about 600 psi.

14. The method of claim 1 wherein said cutting dwell time ranges from about 0.25 to about 0.5 sec.

15. The method of claim 13 wherein said cutting dwell time ranges from about 0.25 to about 0.5 sec.

16. The method of claim 3 wherein said cutting ridge of the thermal die of step (d) does not cut the substrate; and said die-cutting step (e) additionally produces excess decal composite secured to the substrate; and said method further comprises removing said excess decal composite from said substrate.

17. The method of claim 16 additionally comprises applying a premask to the three dimensional laminated decal composite.

18. The method of claim 1 wherein said providing step (d) of said thermal die additionally comprises providing the thermal die with a coating to reduce sticking.

19. The method of claim 17 wherein said providing step (d) of said thermal die additionally comprises providing the thermal die with a coating to reduce sticking.

20. The method of claim 1 additionally comprising wiping the thermal die with a release coat.

21. The method of claim 19 additionally comprising wiping the thermal die with a release coat.

22. The method of claim 1 wherein said cutting ridge of step (d) is essentially an isosceles triangle in vertical cross section.

23. The method of claim 21 wherein said cutting ridge of step (d) is essentially an isosceles triangle in vertical cross section.

24. A three dimensional laminated composite produced in accordance with the method of claim 1.

25. A three dimensional laminated composite produced in accordance with the method of claim 23.

* * * * *